UNITED STATES PATENT OFFICE.

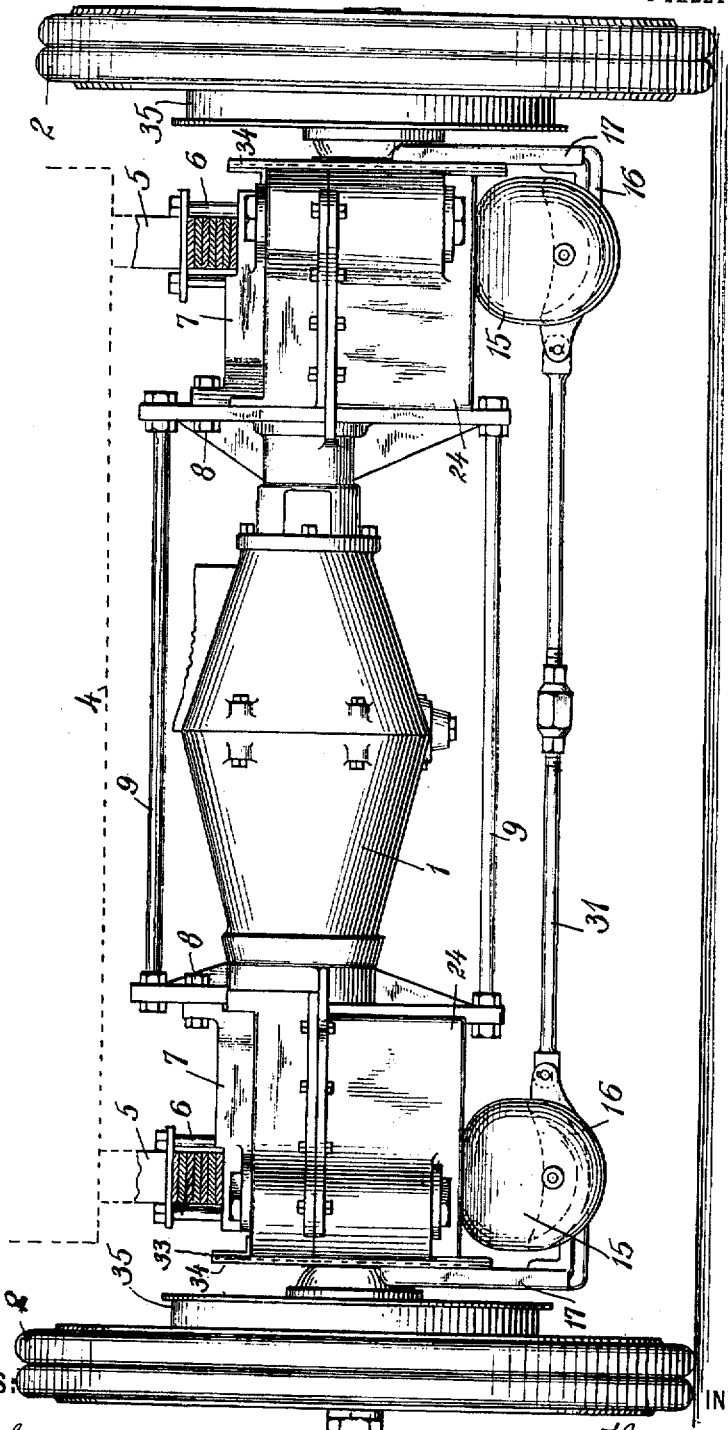

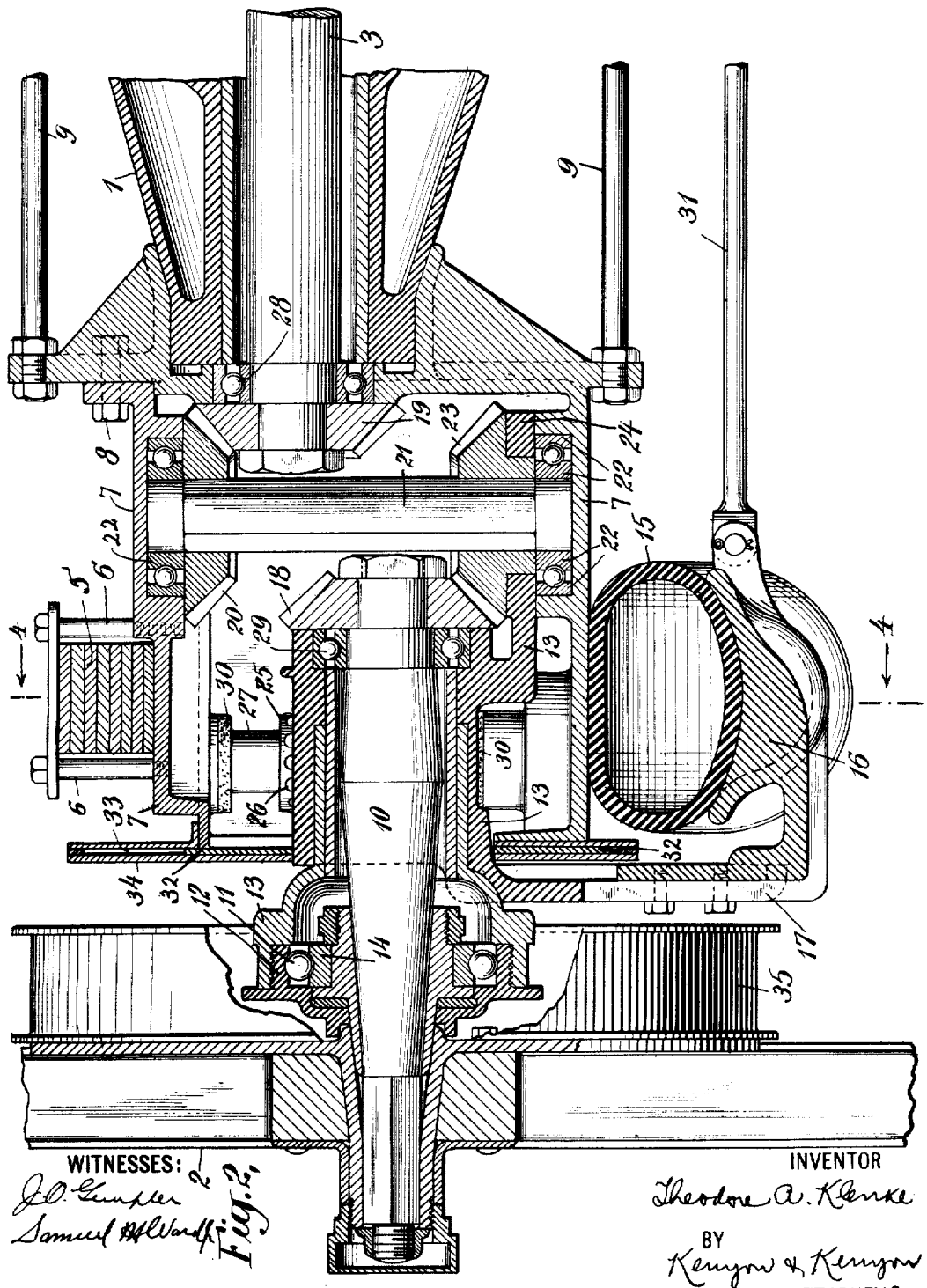

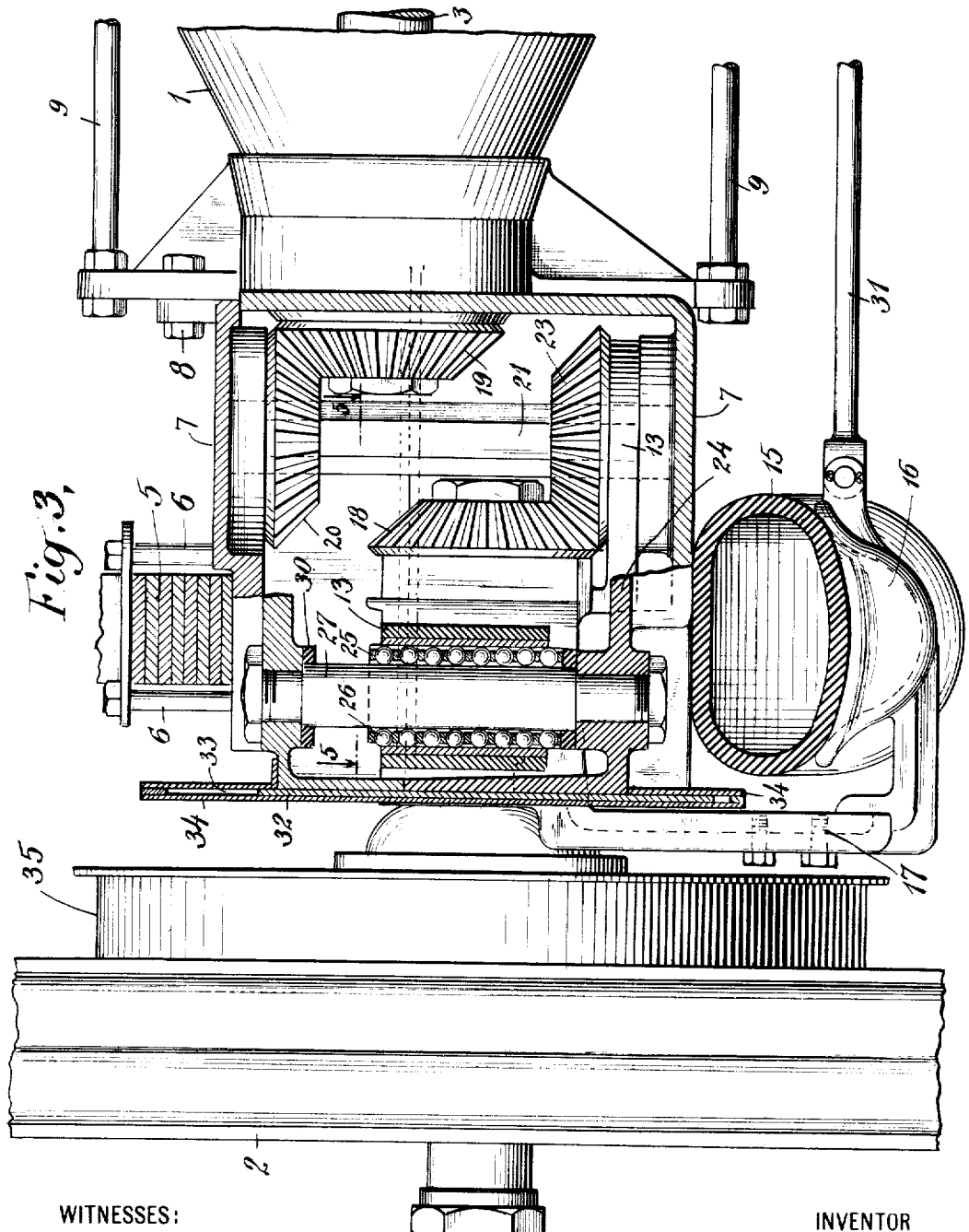

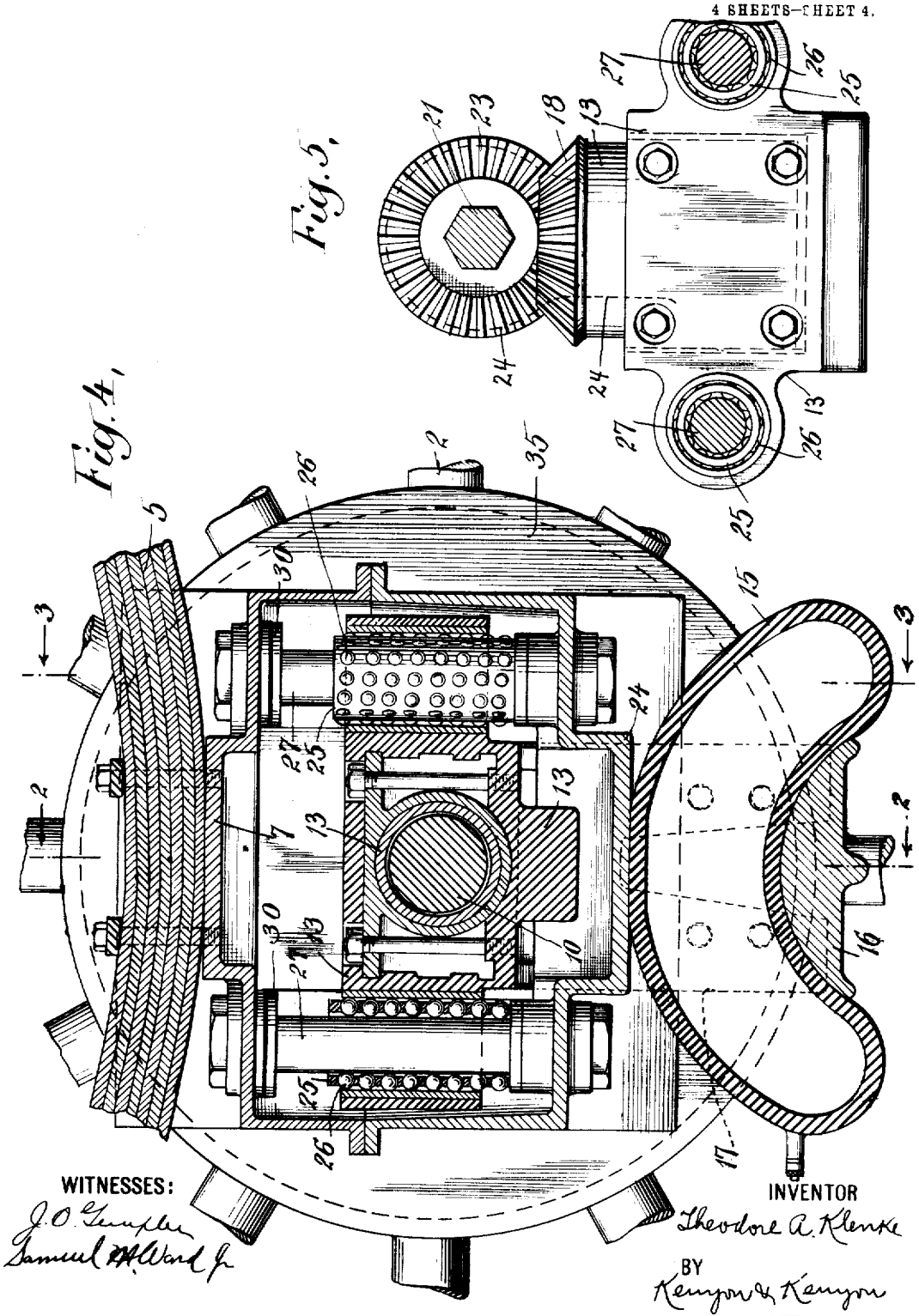

THEODORE A. KLENKE, OF NEW YORK, N. Y., ASSIGNOR TO KLENKE CUSHION AXLE COMPANY, A CORPORATION OF NEW YORK.

MOTOR-VEHICLE.

1,119,019.  Specification of Letters Patent.  Patented Dec. 1, 1914.

Application filed January 15, 1912. Serial No. 671,327.

*To all whom it may concern:*

Be it known that I, THEODORE A. KLENKE, a citizen of the United States, and a resident of the city of New York, in the county and State of New York, have invented a new and useful Improvement in Motor-Vehicles, of which the following is a specification.

My improvement relates to motor vehicles, and more particularly to the driving mechanism for such vehicles.

It has for its object to make the driving connections between the differential driving shaft and the wheel it drives, preferably in a shaft-driven car, of a flexible character so that the wheel may have independent vertical play relatively to the differential and the body of the vehicle without interrupting the drive, and yet be rigidly connected with them as to movements in all other directions, so that a suitable cushioning device, preferably a pneumatic cushion, may be used between the wheel and the differential and other parts of the car without impairing the efficiency or resiliency of such cushioning device.

By means of my improvement the cushioning efficiency or resiliency of a pneumatic cushion is maintained to the highest degree at all times, including the starting or speeding up as well as the slowing down of the vehicle. By means of my improvement the driving connections between the differential shaft and the wheel, in motor vehicles, are also made much more simple and direct. My improvement enables the flexibility of a chain drive to be combined with the direct, rigid and positive drive of a shaft-driven car, thus combining in a simple and effective manner the advantages of both forms of drive.

In the drawings accompanying this specification and forming part hereof, I have shown my invention as embodied in a shaft-driven car, although it is obvious that my invention could be employed with chain-driven cars where a single chain is employed to drive the differential gear.

Referring, now, to the specific embodiment of my invention shown in the drawings, Figure 1 is a plan view of the rear wheels, differential case and other parts connected with the rear axle; Fig. 2 is a vertical longitudinal section taken on the lines 2—2 of Fig. 4, showing the differential driving shaft and the wheel axle and their connecting parts; Fig. 3 is a similar section taken on the lines 3—3 of Fig. 4; Fig. 4 is a vertical cross section taken on the lines 4—4 of Fig. 2; and Fig. 5 is a horizontal section on the lines 5—5 of Fig. 3.

1 represents the differential case of the rear axle of a motor vehicle, and 2, 2 are the rear wheels.

3 is the differential driving shaft of one of the wheels. The remaining parts of the differential and the driving mechanism of the car are not shown, as they form no part of the present invention.

4 represents the chassis and 5, 5 are the ordinary leaf springs. The springs run from the chassis to and are secured by clips 6 to the top of the gear housing 7, which housing is rigidly secured by bolts 8 to the differential casing.

9, 9 are tie rods securing the opposite gear housings to one another to prevent spread of the differential.

10 is a short stub axle to which the wheel 2 is rigidly secured in the ordinary way.

11 are the usual balls of a ball bearing between the axle 10 and a wheel-carrying member or box 13 moving vertically in the gear housing 7.

14 is the race-way of the ball bearing fast with axle 10.

15 are pneumatic cushions each carried on a lower support 16 fast to a dependent arm 17 from the wheel-carrying member or box 13.

The wheel and its support and connections and the differential driving shaft and its support and connections are so constructed and arranged that the wheel is free to have an entirely independent vertical play relatively to the differential shaft and the body of the vehicle; but otherwise, it moves with them rigidly as a unit in all other directions. Between the differential driving shaft and the wheel I provide driving connections for furnishing a direct, positive and continuous rigid drive, which driving connections shall yet be of a flexible character so as to permit the wheel entire freedom of vertical play relatively to the differential shaft and the body of the vehicle, without interfering with the rigid connection of the parts, so far as concerns their movement in other directions, and without interfering with the direct, rigid and positive drive, and without in any way decreasing the efficiency or resiliency of the pneumatic cushion. In the particular form shown, these flexible direct driving connections consist of a series of bevel gears, one connected and movable with the wheel axle and wheel and another connected with the differential driving shaft and direct and positive driving connections between these two gears which maintain a constant positive, rigid driving connection, while permitting the wheel gear complete independence of vertical movement with respect to the gear connected with the differential driving shaft. This particular form of connections I will now explain: 18 is the bevel gear mounted on wheel axle 10, and 19 is the bevel gear mounted on the differential driving shaft 3. 20 is a bevel gear fast to a short vertical driving shaft or pin 21, shown as of hexagonal cross-section, and rotatably mounted in ball bearing 22 carried by gear housing 7. 23 is a bevel gear mounted on shaft 21 so as to be free to move vertically thereon but to be driven thereby. Bevel gear 23 is carried by arm 24 forming a part of wheel box 13, and meshes with gear 18. It will be understood that gears 18 and 23 rise and fall with the wheel box and wheel, gear 23 rising or falling on shaft 21. This vertical movement of the entire wheel box is permitted by means of a ball bearing consisting of a sleeve 25, provided with circular openings containing balls 26, and pins 27 fast in the gear housing 7.

The vertical driving shaft or pin 21 is shown hexagonal in cross-section and fits into a hexagonal opening in gear 23, so that gear 23 is rotated through shaft 21, while the two are free to have vertical movement relatively to each other. Of course, it will be understood that this connection may be made in any other suitable way, as by spline and feather.

The drive between the differential driving shaft 3 and the wheel and its axle is a direct, positive and rigid one, so far as the rotation of the wheel and its axle are concerned, but these driving connections are flexible in that entire freedom or independence of vertical movement is permitted to the wheel and its axle relatively to the driving shaft and the bed of the vehicle. The gears 19 and 18, while having this rigid rotary driving connection, are otherwise independent of each other in their vertical movements.

The connections between the differential casing 1 and the gear housing 7 on the one part with the wheel box 13 and the wheel and its axle on the other, while permitting this freedom of vertical movement of the wheel and differential driving shaft, are of such a character as to compel the differential driving shaft and the wheel axle and wheel otherwise to move rigidly together; that is, in all directions other than a vertical one. The construction of the box 13, ball bearing sleeves 26 and pins 27, fast with gear housing 7 and differential casing 1, makes the parts move together as a unit in all directions but vertical.

28 is a ball bearing for differential driving shaft 3.

29 is a ball bearing of wheel axle 10.

30, 30 are buffers fast on pins 27 to cushion blows of box 13. The distance between the top of wheel box 13 and the buffers 30 is made smaller than the distance between gears 18 and 20 or between 23 and 19, in order to prevent the gears from ever striking and interfering with one another.

31 is a tie rod which secures lower pneumatic cushion supports 16 to each other to prevent spreading of the parts. The upper cushion support resting upon pneumatic cushion 15, is the flat bottom of gear housing 7.

32 is a plate fast to wheel box 13 and free to move vertically in a slot 33 of an extension 34 fast to the gear housing 7. This is for the purpose of keeping dirt and dust from the interior of the gear box and for preventing the escape of lubricant therefrom.

35 is the brake shoe.

In my improved device the pneumatic cushions between the lower support carried by the wheel and the upper support connected with the bed are freed from all side strains or stresses, while free to be compressed vertically in the varying conditions of use, as the two cushion supports, while free to move toward or away from each other, are compelled to move in all other directions as a unit.

It will be observed that, in the above construction, the differential shaft is pneumatically supported and is thus protected from shocks from the wheel.

By means of my improvement the driving connections between the differential driving shaft and the wheel axle are simple, direct and positive and the drive is rigid at all times; and at the same time, an independent vertical movement of the wheel and differential driving shaft and bed is permitted. The pneumatic cushion can be placed directly between the wheel and its short axle and the differential driving axle, thus cushioning the latter and connecting parts in an effective manner. The independence of vertical movement of the wheel relative to the vehicle and its driving parts, and the direct rigid drive are obtained without impairing in any degree the efficiency of the cushioning properties of the pneumatic cushion, either when the car is being started or accelerated, or stopped or retarded in its motion. The inertia due to the starting or stopping of the vehicle, or to a change in its speed, has no effect whatever upon the pneumatic cushion.

The particular form of driving connections between the differential driving shaft and the wheel axle shown in the drawings may, of course, be widely varied without departing from my invention, as long as vertical play of the wheel relatively to the differential and the body of the vehicle and a direct, rigid and positive driving connection between the differential driving shaft and the wheel are obtained.

What I claim as new and desire to secure by Letters Patent, is:

1. In the driving mechanism of a motor vehicle, the combination of a driving gear connected with the driving shaft of the vehicle, a gear connected with a wheel of the vehicle, a frame carrying the driving shaft and movable rigidly therewith, a frame carrying the wheel axle and movable rigidly therewith, said two frames being so connected as to be free to move vertically relative to each other while moving rigidly together in all other directions, a pneumatic bag carried and supported between the said two frames, and a connecting driving device for imparting motion from the driving shaft gear to the wheel gear rigidly connected to one of said frames so as to be immovable vertically as to its gear and movable vertically as to the other frame and its gear, whereby the wheel and driving shaft will be compelled to move together rigidly in all directions but vertically, but may move vertically relatively to each other and whereby the pneumatic cushion may be compressed vertically without being subjected to longitudinal or lateral strains.

2. In the driving mechanism of a motor vehicle, the combination of a driving bevel gear connected with the driving shaft of the vehicle, a frame carrying the driving shaft and bevel gear, a bevel gear connected with a wheel of the vehicle, a frame for carrying the wheel and its bevel gear, said two frames being so connected as to be free to move vertically relative to each other while moving rigidly together in all other directions, a pneumatic bag carried and supported between the said two frames, a pin carried by one of said frames but revoluble therein, and two bevel gears on said pin, one bevel gear fast to the pin and revolving therewith and meshing with the bevel gear on the frame carrying said pin, and the other bevel gear vertically movable on the pin but revoluble therewith and meshing with the bevel gear of the other frame, whereby the pneumatic bag may be compressed vertically between the two frames but in all other directions the two frames and the pneumatic bag will be moved rigidly together.

3. In the driving mechanism of a motor vehicle, the combination of a driving bevel gear connected with the driving shaft of the vehicle, a frame carrying the driving shaft and bevel gear, a bevel gear connected with a wheel of the vehicle, a frame for carrying the wheel and its bevel gear, said two frames being so connected as to be free to move vertically relative to each other while moving rigidly together in all other directions, a pneumatic bag carried and supported between the said two frames, a pin carried by the driving shaft frame but revoluble therein, a bevel gear fast on the pin and meshing with and driven by the driving shaft bevel gear and rotating the said pin, and a bevel gear vertically movable on the pin but rotated thereby and meshing with and driving the wheel bevel gear, whereby the pneumatic bag may be compressed vertically between the two frames but in all other directions the two frames and the pneumatic bag will be moved rigidly together.

4. In the driving mechanism of a motor vehicle, the combination of a driving bevel gear connected with the driving shaft of the vehicle, a frame carrying the driving shaft and bevel gear, a bevel gear connected with a wheel of the vehicle, a frame for carrying the wheel and its bevel gear, said two frames being so connected as to be free to move vertically relative to each other while moving rigidly together in all other directions, a pneumatic bag carried and supported between the said two frames, a pin carried by one of said frames but revoluble therein, the said pin having a cross-section other than a circle, and two bevel gears on said pin, one bevel gear fast to the pin and revolving therewith and meshing with the bevel gear on the frame carrying said pin, and the other bevel gear having a central opening of the same cross-section as that of the pin through which opening the pin passes so that the pin and the gear will be caused to rotate together while free to move vertically on each other, whereby the wheel will be rotated with the bevel gear of the driving shaft while the shaft and the axle of the wheel will be free to move vertically relatively to each other and whereby the pneumatic cushion may be compressed vertically without being subjected to longitudinal or lateral strains.

5. In the driving mechanism of a motor vehicle, the combination of a driving bevel gear connected with the driving shaft of the vehicle, a frame carrying the driving shaft and bevel gear, a bevel gear connected with a wheel of the vehicle, a frame for carrying the wheel and its bevel gear, said two frames being so connected as to be free to move vertically relatively to each other while moving rigidly together in all other directions, a pneumatic bag carried and supported between the said two frames, a pin carried by the driving shaft frame but revoluble therein, and having a cross-section other than a circle, a bevel gear fast on the pin and meshing with and driven by the driving shaft bevel gear and rotating said pin, and a bevel gear having a central opening of the same cross-section as that of the pin through which the pin passes so that the pin and gear will be caused to rotate together while the bevel gear will be free to move vertically on the pin, said last-named bevel gear meshing with and driving the wheel bevel gear, whereby the wheel will be rotated with the bevel gear of the driving shaft while free to move vertically relatively to said shaft.

6. In the driving mechanism of a motor vehicle, the combination of a driving gear connected with the driving shaft of the vehicle, a gear connected with a wheel of the vehicle, continuous rigid driving connections between the two gears consisting of two parts, one part secured to one gear and moving vertically therewith, the other part secured to the other gear and moving vertically therewith, the said two parts being constructed and arranged so as to be free to slide vertically on each other without interrupting the continuous rigid drive, a pneumatic bag, and two supports therefor movable vertically relatively to each other, one support connected to and moving with one of the gears, and the other support connected to and moving with the other gear, and connections between the two supports compelling them to move rigidly together in all directions except vertically whereby the pneumatic bag may be variably compressed vertically between the two supports without interrupting the continuous rigid drive, and without subjecting the pneumatic cushion to lateral and longitudinal strains.

7. In the driving mechanism of a motor vehicle, the combination of a driving gear connected with the driving shaft of the vehicle, a gear connected with a wheel of the vehicle, continuous driving connections between said gears consisting of two parts rigidly connected rotatively but independent of each other vertically, a pneumatic bag supported and compressible between the wheel and the driving shaft, and means for preventing the passage through the pneumatic cushion of lateral or longitudinal strains whereby the continuous rigid rotary drive will not affect the resiliency of the pneumatic bag and whereby lateral and longitudinal strains through the pneumatic cushion will be avoided.

In testimony whereof, I have signed my name to this specification, in the presence of two subscribing witnesses.

THEODORE A. KLENKE.

Witnesses:
H. B. YOUNKIN,
J. O. GEMPLER.

It is hereby certified that in Letters Patent No. 1,119,019, granted December 1, 1914, upon the application of Theodore A. Klenke, of New York, N. Y., for an improvement in "Motor-Vehicles," errors appear in the printed specification requiring correction as follows: Page 3, lines 41 and 120, and page 4, lines 45–46, 58, and 63, for the word "cushion" read *bag;* and that the said Letters Patent should be read with these corrections therein that the same may conform to the record of the case in the Patent Office.

Signed and sealed this 2nd day of February, A. D., 1915.

[SEAL.] R. F. WHITEHEAD,

*Acting Commissioner of Patents.*